US009026078B2

(12) United States Patent
Hu et al.

(10) Patent No.: US 9,026,078 B2
(45) Date of Patent: May 5, 2015

(54) METHOD AND APPARATUS FOR POLICY MANAGEMENT IN A COMMUNICATION SYSTEM (71) Applicant: AT&T Intellectual Property I, LP, Atlanta, GA (US)

(72) Inventors: Qingmin Hu, Sammamish, WA (US); Farooq Bari, Kirkland, WA (US); Terry Figurelle, Redmond, WA (US); Jie McKnight, Bellevue, WA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 16 days.

(21) Appl. No.: 14/030,329

(22) Filed: Sep. 18, 2013

(65) Prior Publication Data

US 2015/0079925 A1 Mar. 19, 2015

(51) Int. Cl.
*H04M 11/00* (2006.01)
*H04W 4/26* (2009.01)
*H04M 15/00* (2006.01)

(52) U.S. Cl.
CPC ............... *H04W 4/26* (2013.01); *H04M 15/66* (2013.01)

(58) Field of Classification Search
CPC .. H04W 24/00; H04M 2215/32; H04M 15/00
USPC ............................ 455/406, 405, 412.1, 414.1
See application file for complete search history.

(56) References Cited

U.S. PATENT DOCUMENTS

| 7,047,492 | B2 | 5/2006 | Fujiwara |
| 7,085,741 | B2 | 8/2006 | Lao et al. |
| 7,539,747 | B2 | 5/2009 | Lucovsky et al. |
| 7,913,309 | B2 | 3/2011 | Starostin et al. |
| 8,146,133 | B2 | 3/2012 | Moon et al. |
| 8,326,983 | B2 | 12/2012 | Strohwig et al. |
| 8,335,985 | B2 | 12/2012 | Kakehi |
| 8,356,092 | B2 | 1/2013 | Rasanen |
| 8,655,309 | B2 * | 2/2014 | Smith et al. ............. 455/406 |

(Continued)

OTHER PUBLICATIONS

Ahmed, Toufik, "Dynamic QoS Adaptation Using COPS and Network Monitoring Feedback", Management of Multimedia on the Internet, pp. 250-262, 2002.

(Continued)

*Primary Examiner* — Nghi H Ly
(74) *Attorney, Agent, or Firm* — Guntin & Gust, PLC; Ed Guntin (57) ABSTRACT

A system that incorporates the subject disclosure may perform, for example, operations including monitoring events relating to activities by a plurality of communication devices, content sources supplying content to the plurality of communication devices, and network conditions during content exchanges between the plurality of communication devices and the content sources, tagging the events to generate tagged events, detecting an event initiated by a communication device of the plurality of communication devices, obtaining tagged event information from the tagged events according to the event detected, generating a policy according to the tagged event information, and transmitting the policy to a policy enforcement function system to facilitate a communication session between the communication device and the content source according to the policy. Other embodiments are disclosed.

20 Claims, 7 Drawing Sheets

(56) References Cited

U.S. PATENT DOCUMENTS

| | | |
|---|---|---|
| 2009/0327137 A1 | 12/2009 | Raley et al. |
| 2010/0222021 A1* | 9/2010 | Balsan et al. .............. 455/406 |
| 2011/0167470 A1 | 7/2011 | Walker et al. |
| 2012/0123870 A1 | 5/2012 | Denman et al. |
| 2012/0276867 A1 | 11/2012 | McNamee et al. |
| 2013/0196623 A1 | 8/2013 | Lehane et al. |

OTHER PUBLICATIONS

Chieng, David et al., "Agent-Enhanced Dynamic Service Level Agreement in Future Network Environments", Management of Multimedia on the Internet, pp. 299-312, 2001.

Weiser, "What is Pervasive Computing?", pp. 71-140, 2001.

\* cited by examiner

METHOD AND APPARATUS FOR POLICY MANAGEMENT IN A COMMUNICATION SYSTEM

FIELD OF THE DISCLOSURE

The subject disclosure relates to a method and apparatus for policy management in a communication system.

BACKGROUND

Legacy policy management systems generate network policies based on static network policies. Static network policies are generally defined by network operators to satisfy business and network objectives. With the growth of broadband services, static policies may be insufficient to manage communication networks.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments of for dynamic/transient policy data management in networks with broadband traffic. Other embodiments are included in the subject disclosure.

One embodiment of the subject disclosure includes a network policy management system a memory to store executable instructions, and a processor coupled to the memory. Responsive to executing the instructions, the processor performs operations including collecting information comprising content requests from a plurality of wireless communication devices utilizing services of a cellular communication system, identifications of the plurality of wireless communication devices, identifications of content sources supplying the content being requested, and network conditions during a period when the content requests are received and processed, tagging the information to generate tagged information, storing the tagged information in a user data repository, receiving a new content request from a communication device of the plurality of wireless communication devices, retrieving tagged information according to the new content request, a first identification of the wireless communication device, a second identification of a content source supplying content identified in the new content request, or combinations thereof, generating a communication session policy according to the tagged information, and transmitting the communication session policy to a policy enforcement function system for facilitating a configuration of network elements that enable a communication session between the wireless communication device and the content source for transport of the content identified in the new content request, where the communication session is configured with a quality of service identified in the communication session policy.

One embodiment of the subject disclosure includes a machine-readable storage medium, including executable instructions which, responsive to being executed by a processor, cause the processor to perform operations including collecting transitory information relating to activities by a plurality of communication devices, activities by content sources supplying content to the plurality of communication devices, and network traffic conditions during content exchanges between the plurality of communication devices and the content sources, tagging the transitory information to generate tagged transitory information, storing the tagged transitory information in a user data repository, receiving a new content request from a communication device of the plurality of communication devices, obtaining tagged transitory information relating to the new content request, a first identification of the communication device, a second identification of a content source supplying content identified in the new content request, or combinations thereof, generating a network configuration policy according to the tagged transitory information, and transmitting the network configuration policy to a policy enforcement function system for provisioning network elements that facilitate a communication session between the communication device and the content source for transport of the content identified in the new content request according to a quality of service identified in the network configuration policy.

One embodiment of the subject disclosure includes a method for monitoring, by a system comprising a processor, events relating to activities by a plurality of communication devices, content sources supplying content to the plurality of communication devices, and network conditions during content exchanges between the plurality of communication devices and the content sources, tagging, by the system, the events to generate tagged events, receiving, by the system, a content request from a communication device of the plurality of communication devices, obtaining, by the system, tagged event information from the tagged events according to the event detected, generating, by the system, a policy according to the tagged event information, and transmitting, by the system, the policy to a policy enforcement function system to facilitate a communication session between the communication device and the content source according to the policy.

Figure 1:
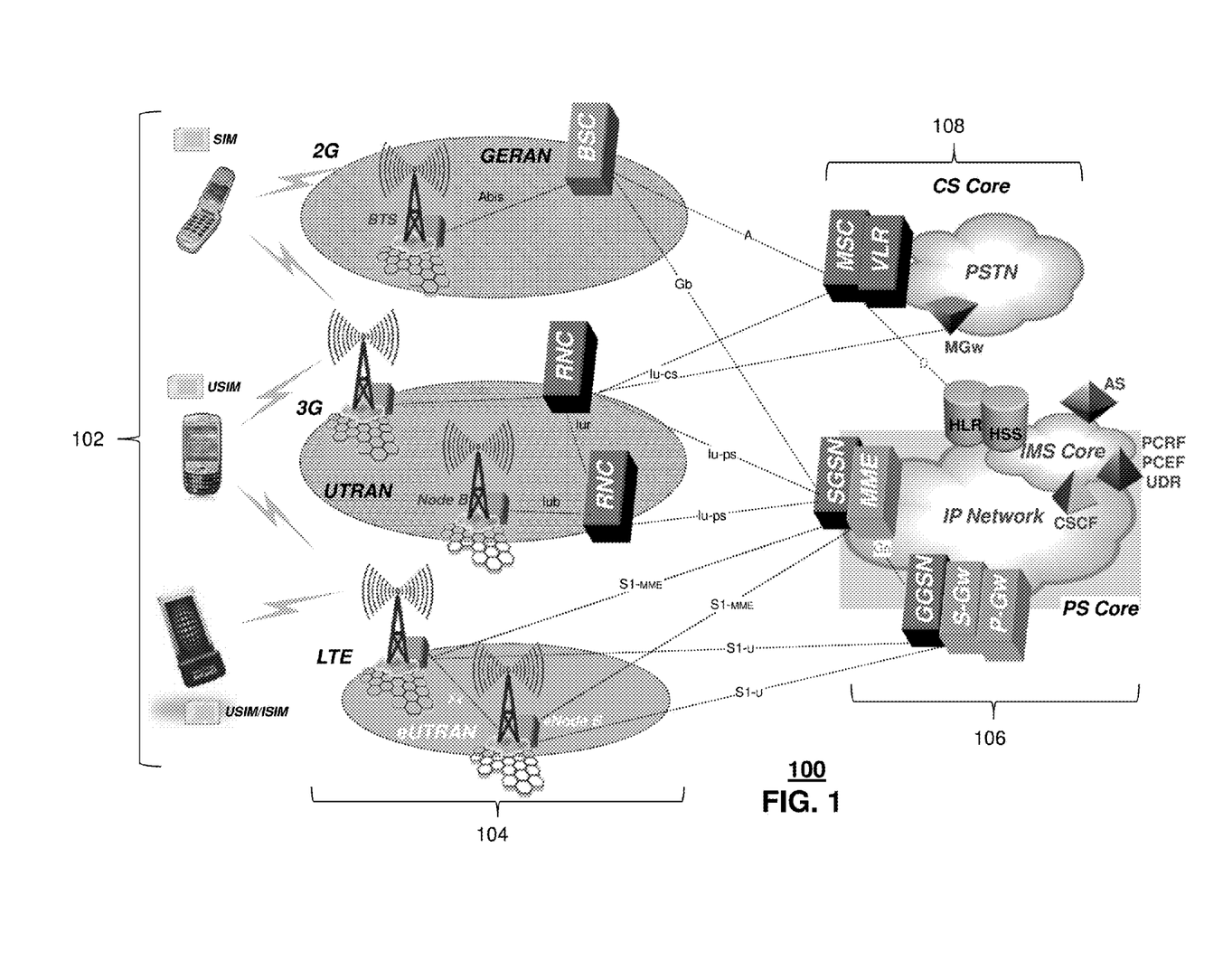
FIG. 1 depicts an illustrative embodiment of a communication system for providing media content to communication devices.

FIG. 1 depicts an illustrative embodiment of a communication system 100 for providing media content to communication devices 102. The communication system 100 can comprise a circuit switched (CS) core 108 and a packet switched (PS) core 106 coupled to a plurality of 2G, 3G and LTE base stations 104 providing wireless services to communication devices 102. The circuit switched core 108 can comprise a Public Switched Telephone Network (PSTN) coupled to a mobile switching center (MSC), a visitor location register (VLR), and a media gateway (MGW) in communication with the base stations 104 by way of a base station controller (BSC) or radio network controller (RNC). The packet switched core 106 can include an IP network coupled to an IP multimedia subsystem (IMS) core by way of call session control function interfaces (CSCF), and application servers (AS). The IP network can also be coupled to a serving GPRS support node (SGSN), a gateway GPRS support node (GGSN), a mobility management entity (MME), a packet data network gateway (P-Gw), and a signaling gateway (S-Gw). The IMS core can utilize a policy and charging rules function (PCRF), a policy and charging enforcement function (PCEF), and a user data repository (UDR) to manage network configurations for the communication devices 102.

Figure 2:
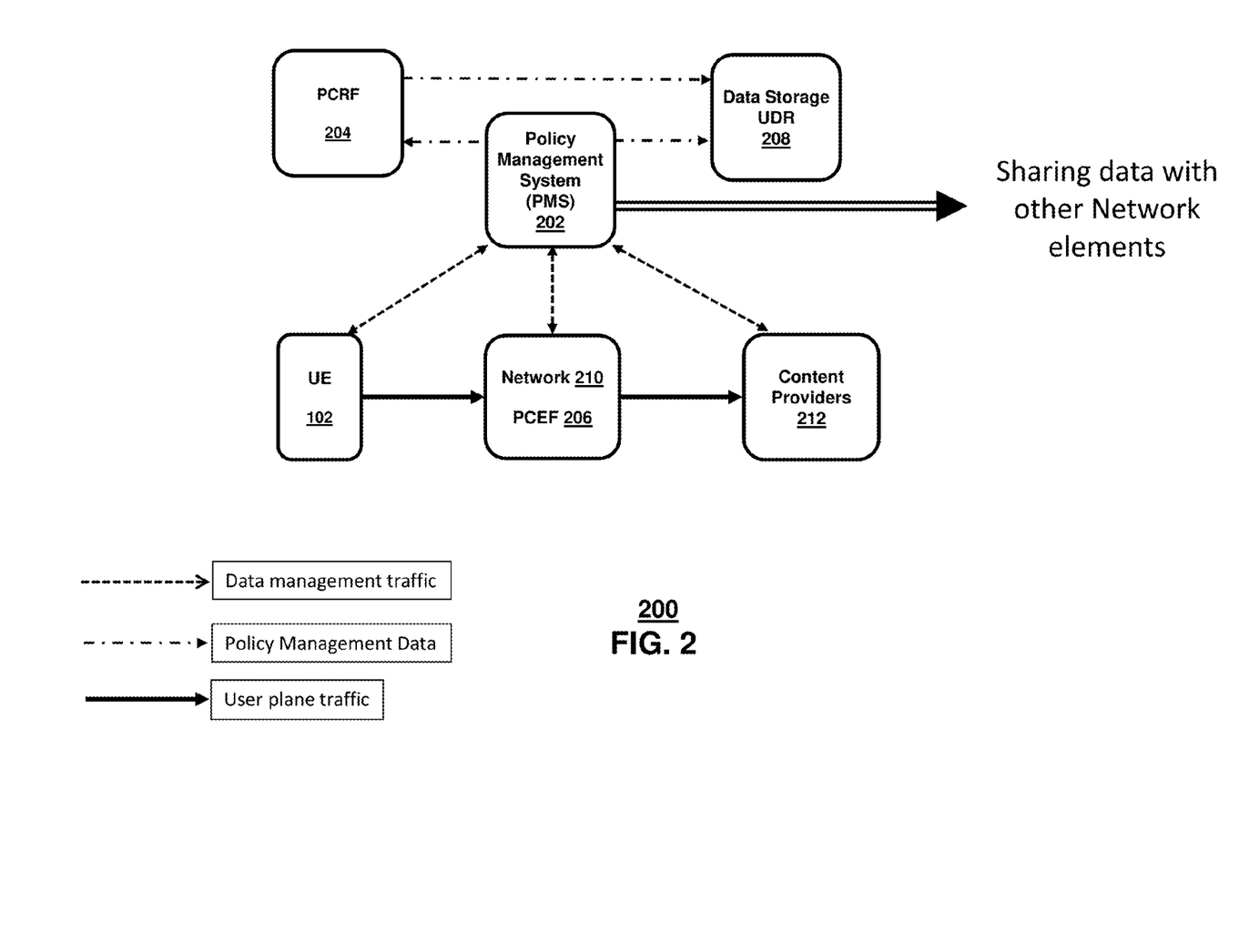
FIG. 2 depicts an illustrative embodiment of a system for managing network policies.

FIG. 2 depicts an illustrative embodiment of a system 200 for managing network policies of the packet switched core 106. System 200 can comprise a policy management system (PMS) 202 coupled to a PCRF 204, a PCEF 206, and a UDR 208 as shown in FIG. 1. The PMS 202 can be communicatively coupled to the communications devices 102 of FIG. 1 (referred to herein as user equipment or UEs 102), network elements of the communication system 100 shown in FIG. 1 (referred to herein as network 210), and equipment of content providers 212. The PCEF 206 is one of the network elements of network 210 as shown in FIG. 2. Content providers 212 can utilize content source equipment to supply media content to the UEs 102. The content providers 212 can be independently operated entities serving the general public, subscribers, or a social network of subscribers (e.g., YouTube™, Hulu™ Netflix™, Facebook™ and so on). Service data flows between the UE 102, the PCEF 206 and the content/service provider 212. This is the user plane traffic identified in FIG. 2. The policy data that is used to setup and dynamically change the session linked to the user plane traffic are shown in dotted line as control plane traffic in FIG. 2.

Figure 3:
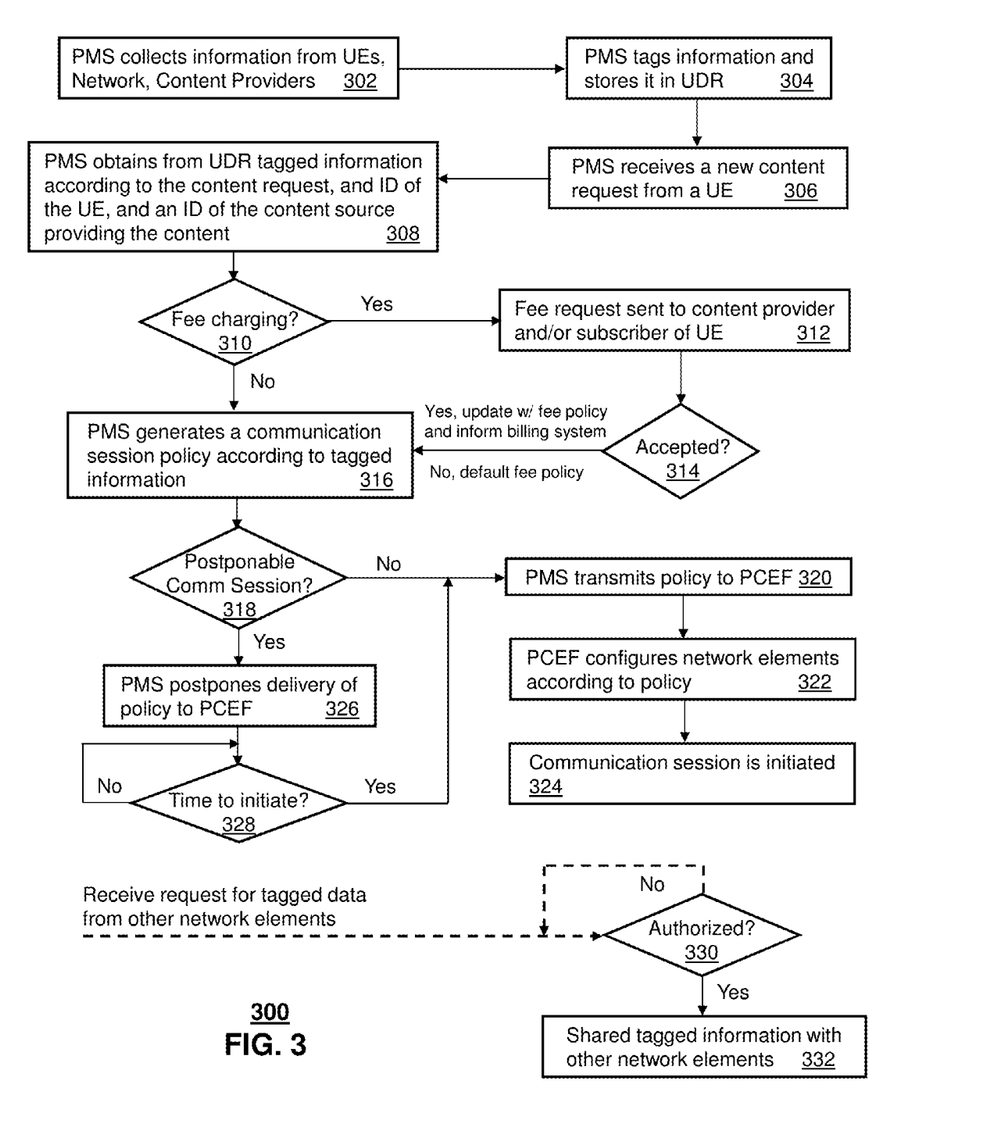
FIG. 3 depicts an illustrative embodiment of a method used in portions of the systems described in FIGS. 1-2.

FIG. 3 depicts an illustrative embodiment of a method 300 that can be used to operate portions of the systems 100-200 described in FIGS. 1-2. Method 300 can begin with step 302 in which the PMS 202 can be configured to collect information from the UEs 102, the network 210, and the content providers 212. The information collected can include, for example, content requests from the UEs 102, identifications of the UEs 102 making the requests, the locations of the UEs 102 when the requests are made, and/or other identifying and descriptive information about the UEs 102 (e.g., model number, resources of the UE, usage information of the UE and so on). The content requested by the UEs 102 can include audio content, still image content, video content, or combinations thereof.

The information collected by the PMS 202 can further include, for example, the identifications of the content providers 212 supplying the content requested by the UEs 102, a time to live (TTL) indicator (e.g., length of video) of content requested by the UEs 102, and network traffic conditions experienced by the network 210 during the time when the content requests are received and processed. Network conditions can include information enabling the PMS 202 to detect peak traffic times, packet retransmissions, rate of dropped calls, and other network parameters that may indicate traffic conditions at various times when content requests are submitted by the UEs 102.

As the PMS 202 collects this information, it can tag the information and direct the PCRF 204 to store this information in the UDR 208 at step 304. Alternatively, the PMS 202 can communicate with the UDR 208 directly (thereby bypassing the PCRF 204) to store the tagged information. The tagged information can include information descriptive of the UEs 102, where the UEs 102 are located at the time of the content requests are submitted, what entity (UE subscriber or content provider) can pay for a communication session to enable the data transfer between the UEs 102 and the content providers 212, TTL calculations of the data being requested, network congestion conditions at the time when data requests are made by UEs 102, identities of the content providers 212 sourcing the content requests by the UEs 102, and so on. The PMS 202 can also collect real-time network information after a communication session is established between the UEs 102 and the content providers 212, tag this information and store it in the UDR 210. For example, the PMS 202 can collect information from network elements of the network 210 descriptive of the quality of transmission during the communication session such as the number of dropped packets during the communication session, the number of packet retransmissions, latency metrics, jitter metrics, bit error rate data, congestion levels experienced by network routers, and so on.

The tagged information can be tagged according to subject matter, time of occurrence, identity of device providing the information (e.g., UE 102, network 210, content provider 212), and so on. The PMS 202 can utilize the tags to direct the UDR 208 to provide specific information associated with the tags, which like an address for obtaining specific information from a memory device. The PMS 202 can maintain a local database of tags indexes, while the UDR 208 can organize storage of the tagged information according to the tag indexes to enable retrieval by the PMS 202.

Over the course of much iteration of steps 302 and 304, the PMS 202 can collect a substantial amount of intelligence about the UEs 102, the network 210, and that content providers 212 that can be used to model the behavior of the UEs 102, the network 210, and the content providers 212, individually and collectively. For example, the PMS 202 can search the history of a particular UE 102 requesting content, and determine from its history, the frequency of content requests, the average TTL calculations of requested content, the type of content being requested, and so on. Additionally, the PMS 202 can analyze a history of network conditions collected and tagged by the PMS 202 at times when the UE 102 is submitting content request.

With this in mind, the PMS 202 can process at step 306 new content requests from a UE 102. At step 308, the PMS 102 can obtain from the UDR 208 tagged information relating to the content request, an identification of the UE 102, and/or an identification of the content provider 212. For example, the tagged information can indicate that the content being requested (e.g., an episode of Suits) has a particular TTL, the UE 102 has requested other episodes of Suits previously, the content provider 212 that will provide the content is once again Netflix™, network traffic during prior requests near the same time as the present request is similar to present network conditions, the content provider 212 has agreed on prior occasions to pay for a desired quality of service for the subscriber of the UE 102, the subscriber of the UE 102 has on prior occasions willingly accepted to pay a premium fee to be given network priority to substantially reduce network interruptions of a data stream transmitted by the content provider 212, and so on.

With this information, the PMS 202 can proceed to step 310 where it determines if fee charges can be requested based on an analysis of the tagged information obtained at step 308. If so, the PMS 202 proceeds to step 312 where it submits a fee request to equipment of the content provider 212 and/or the UE 102. The equipment of the content provider 212 may be preconfigured to accept fee requests from the PMS 202, and process them according to rules established by the content provider 212. For example, the content provider 212 may configure the content provider equipment to accept fee requests when the content request is originated by a paying subscriber.

In such instances, the fee paid may be for a quality of service (QoS) configuration particular for its subscribers to guarantee throughput, reduced latency, low jitter, high definition content grade, and so on. For guests sampling content of the content provider 212, the provider may configure the content provider equipment to pay the requested fee for a limited number of samples, and thereafter reject fee payments, thereby resorting to a standard QoS offered by the PMS 202 when fees are not paid by the content provider 212. In the case of the UE 102, a fee request can be presented, in one embodiment, to the user of the UE 102 by way of a user interface of the UE (e.g., display, audio, combinations thereof). The fee request can be an offer to further enhance the QoS offered to the content provider 212. The user of the UE 102 can provide input to accept or reject the offer. In one embodiment, the user can provision the UE 102 to recall the user input that rejected or accepted the fee request to automatically accept or reject subsequent fee requests in the same manner when the user initiates additional content requests from the same content provider 212 or other content providers 212.

At step 316, the PMS 212 can generate a communication session policy based on the analysis of the tagged information without QoS enhancements resulting from fee payments generated by the UE 102 or the content provider 212. If, on the other hand, messages have been received from the content provider 212 and/or the UE 102 agreeing to pay fees for enhanced QoS services, then the PMS 212 can generate at step 316 a different communication session policy that supersedes the services of a communication session policy that would otherwise have been generated without fee payments. The communication session policy generated at step 316 can include among other things a selection of a specific QoS option from among a plurality of QoS service options available to the PMS 202, a network routing configuration for selecting network elements to enable the communication session according to the selected QoS option, a time limit for maintaining the specific QoS, a backup routing path if the QoS priority is high, and so on. When fees are accepted, the PMS 202 can inform an online charging system (OCS), not shown in the figures, of the accepted fees by the content provider 212 and/or the subscriber of the UE 102. The OCS can in turn electronically charge such fees to the accounts of the respective parties.

At step 318, the PMS 202 can determine from the content request submitted by the UE 102, and network traffic conditions at the time the request is received, whether the communication session needs to be established immediately or can be postponed. For example, the user of the UE 102 may have requested a download of a movie to his/her set-top box for playback at a later time. In such instances, the communication session can be postponed if network traffic is high at the time the request is received. In another instance, if it is not apparent to the PMS 202 that the user's request is immediate, and network traffic is high, the PMS 202 can send a message to the UE 102 inquiring if it would be acceptable to postpone the communication session until a specified time. The inquiry can be combined with an offer to reduce (or waive) fees for a communication session having an enhanced QoS service (e.g., supporting high definition content) if the user accepts postponing transmission of the content.

In another embodiment, the PMS 202 can contact the service and content provider 212 to determine an expected delivery time of the content. If the delivery time is not immediate, the PMS 202 can postpone the communication session. Similarly, if network traffic conditions are high, the PMS 202 can send a request to the content provider 212 inquiring if it would be acceptable to postpone the communication session until a specified time. The content provider 212 can in turn negotiate a later transmission with the user of the UE 102. The foregoing embodiments can be combined. Additionally, other suitable methods for postponement can be applied to the subject disclosure.

If at step 318 the content request is determined not to be postponable, the PMS 202 can proceed to step 320 where it transmits the communication session policy generated at step 316 to the PCEF 206 for immediate processing. The PCEF 206 can configure the network elements according to the QoS identified in the policy at step 322 and immediately initiate the communication session at step 324. If, the communication session can be postponed, the PMS 202 can proceed to step 326 where it stores the communication session policy for a scheduled time consistent with the postponement analysis performed at step 318. When the scheduled time occurs at step 328, the PMS 202 can perform steps 320-324 as previously described.

Concurrent to the above steps, network elements of other service provider networks can request tagged information from the PMS 202. Based on inter-service provider agreements, the PMS 202 can be configured at step 330 to instruct the PCRF 204 to supply tagged information at step 332 to the requesting network elements. Inter-service provider agreements can be useful when service providers share networks (domestically or internationally) to expand coverage for their subscribers. The tagged information supplied to the network elements can be used for determining the behavior of the UEs 102 roaming into another service provider network, and can be used for generating communication session policies for the roaming UEs 102 in a manner similar to the steps described above or according to other methods suitable for use by the subject disclosure to their business and operational objectives.

Figure 4:
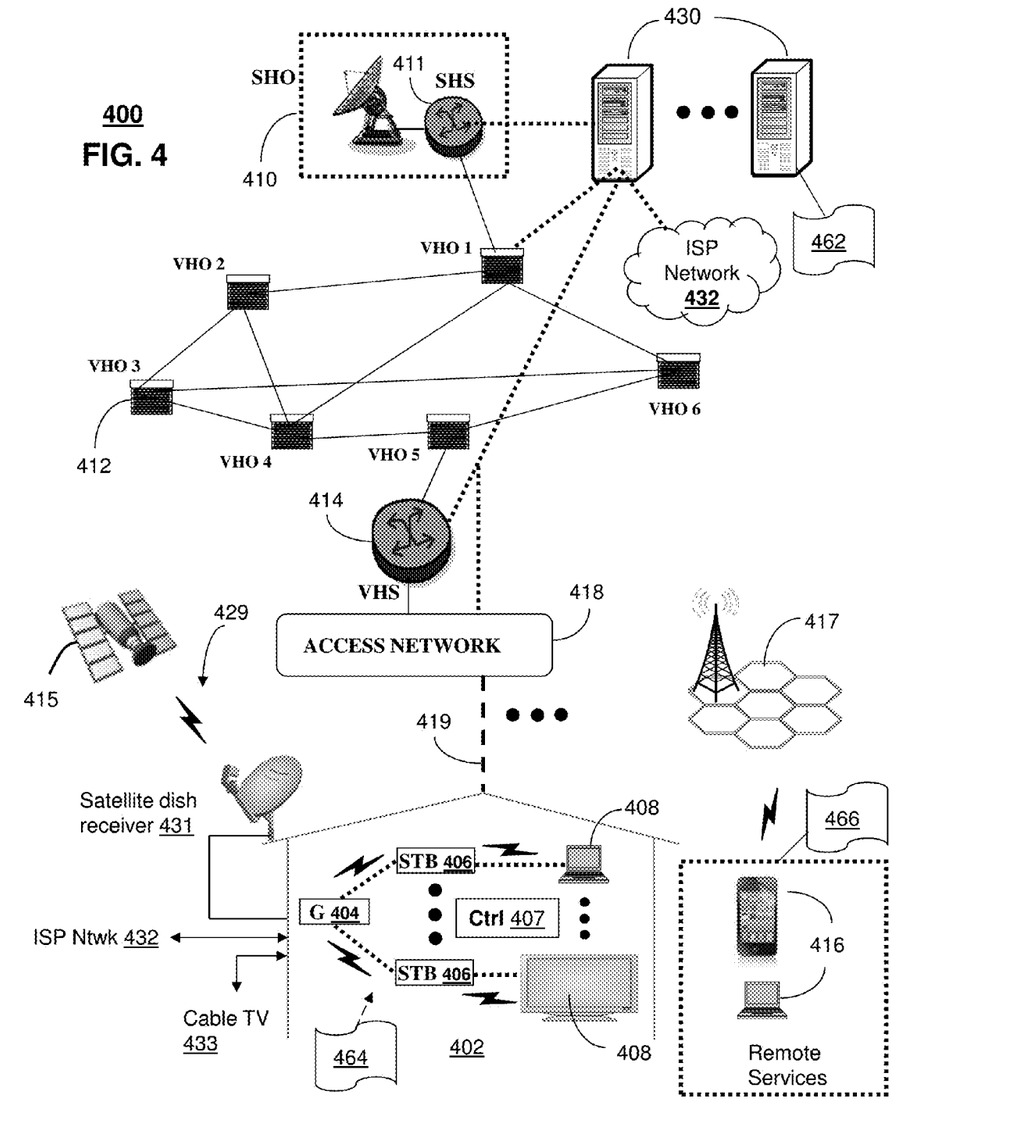
FIGS. 4-5 depict illustrative embodiments of communication systems that provide media services.

FIG. 4 depicts an illustrative embodiment of a first communication system 400 for delivering media content. The communication system 400 can represent an Internet Protocol Television (IPTV) media system. Communication system 400 can be overlaid or operably coupled with systems 100-200 of FIGS. 1-2 as another representative embodiment of communication system 400. Communication system 400 can be adapted in whole or in part to perform method 300 as described above.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a PMS server (herein referred to as PMS server 430). The PMS server 430 can use computing and communication technology to perform function 462, which can include among other things, some or all of the method steps of FIG. 3. The media processors 406 and wireless communication devices 416 can be provisioned with software functions 462 and 464, respectively, to utilize the services of PMS server 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
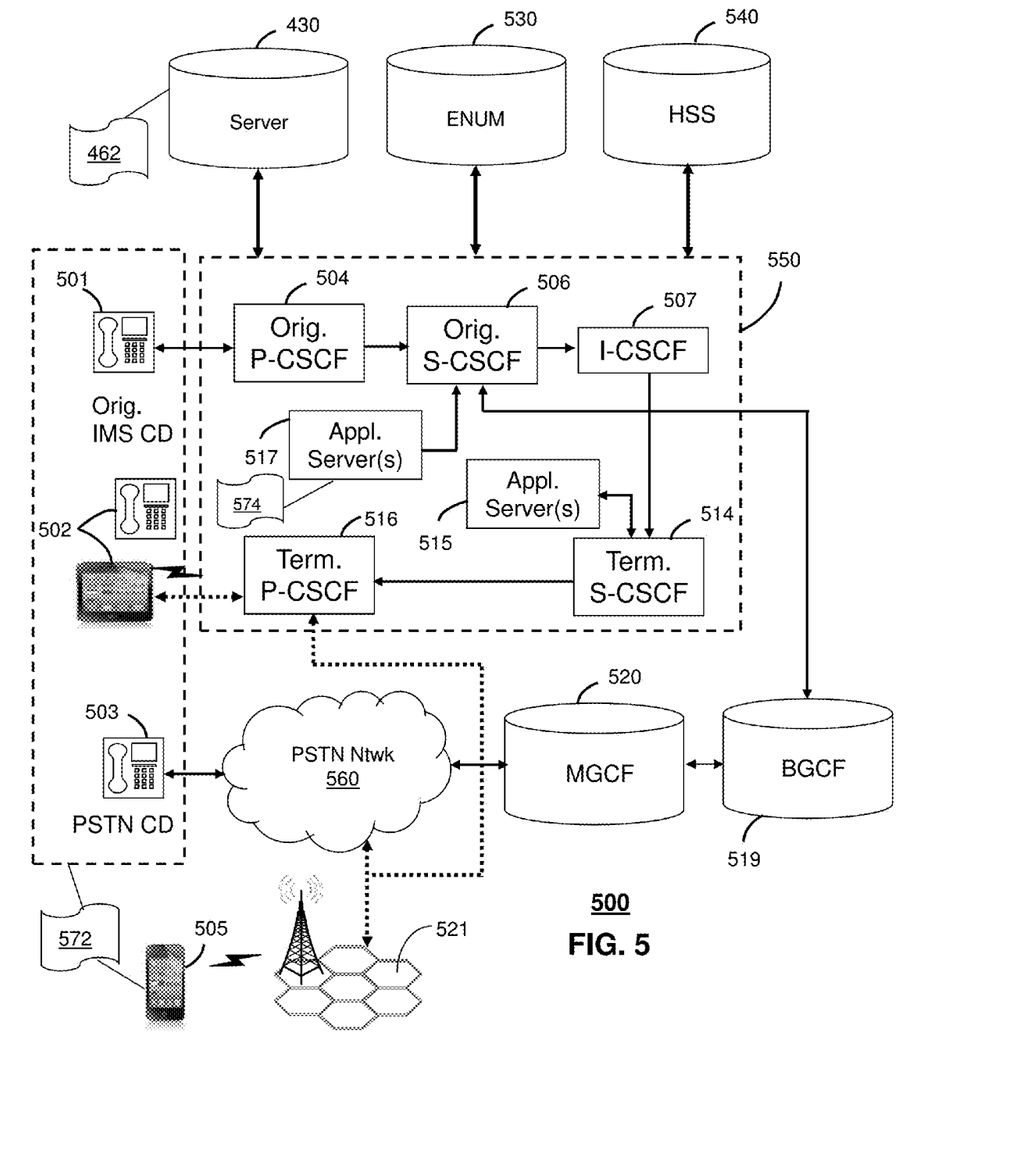

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with systems 100-200 of FIGS. 1-2 and communication system 400 as another representative embodiment of communication system 400. Communication system 500 can be adapted in whole or in part to perform method 300 as described above.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The PMS server 430 of FIG. 4 can be operably coupled to the second communication system 500 for purposes similar to those described above. PMS server 430 can perform function 462 and thereby provide policy services to the CDs 501, 502, 503 and 505 of FIG. 5. CDs 501, 502, 503 and 505, which can be adapted with software to perform function 572 to utilize the services of the PMS server 430. PMS server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
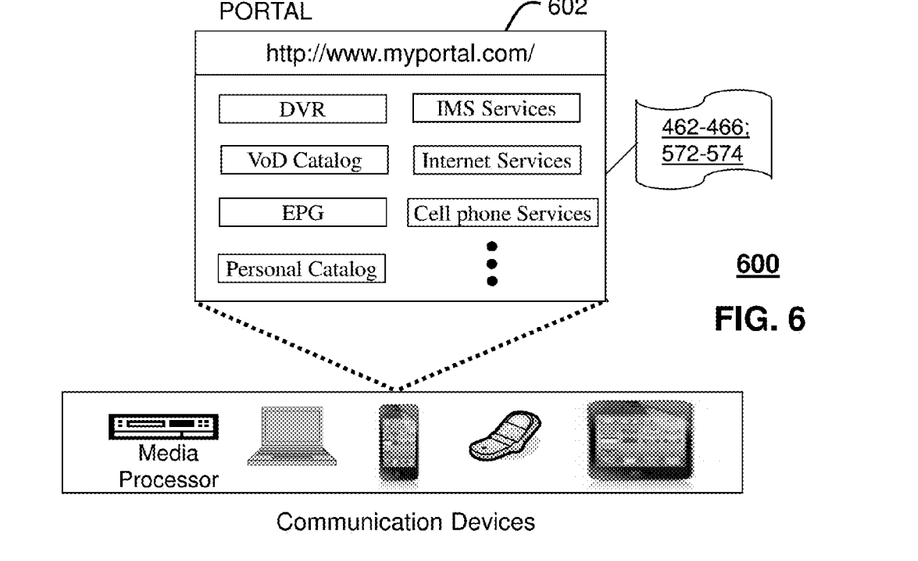
FIG. 6 depicts an illustrative embodiment of a web portal for interacting with the communication systems of FIGS. 1-2 and 4-5.

FIG. 6 depicts an illustrative embodiment of a web portal 602 which can be hosted by server applications operating from the computing devices 430 of the communication system 100 illustrated in FIG. 1. Communication system 600 can be overlaid or operably coupled with systems 100-200, communication 400, and/or communication system 500 as another representative embodiment of systems 100-200 of FIGS. 1-2, communication 400, and/or communication system 500. The web portal 602 can be used for managing services of communication systems 400-500. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 602 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can further be utilized to manage and provision software applications 462-464, and 572-574 to adapt these applications as may be desired by subscribers and/or service providers of communication systems 100-200, 400-500.

Figure 7:
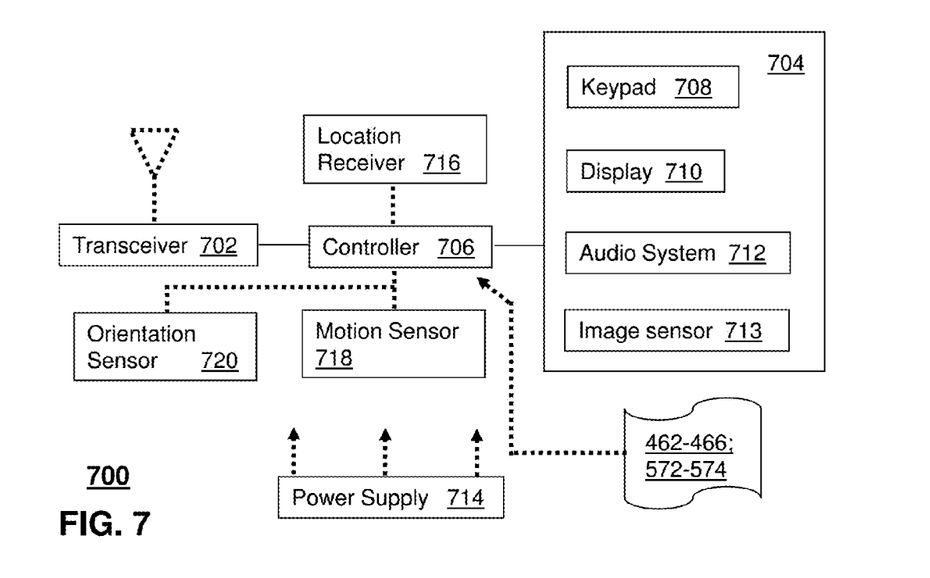
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2, and FIGS. 4-5. Communication device 700 can perform in whole or in part the steps described in FIG. 3.

To enable these features the features described in FIG. 3, communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of systems 100-200 of FIGS. 1-2, communication system 400, and communication system 500. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, the functions of the PMS 202 can be integrated in whole or in part in the PCRF 204, the PCEF 206, or combinations thereof. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
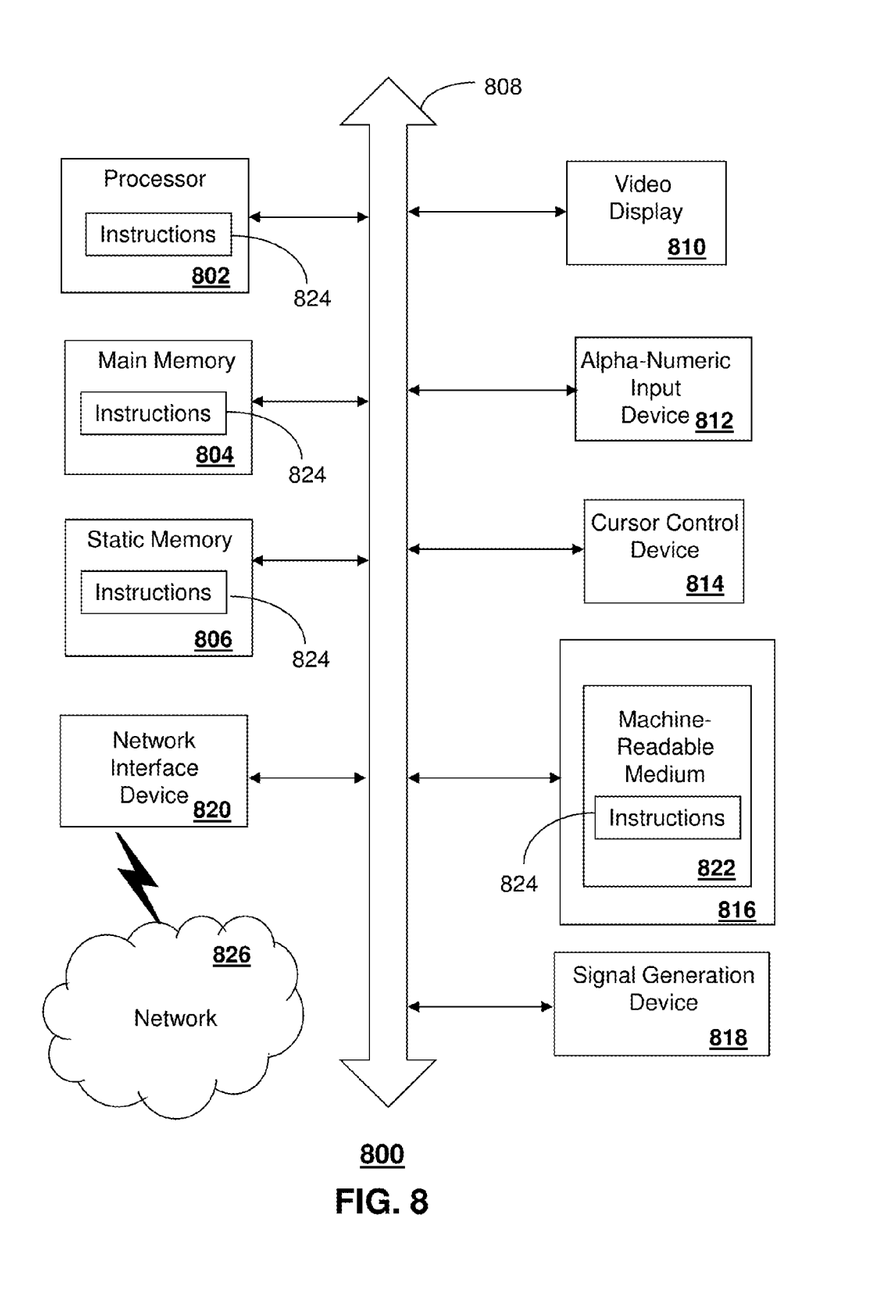
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the PMS server 202, 430, the PCRF 204, the UDR 208, the media processor 406, the CDs of FIG. 5, and other devices of FIGS. 1-6. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network policy management system, comprising:
a memory to store executable instructions; and
a processor coupled to the memory, wherein responsive to executing the instructions, the processor performs operations comprising:
collecting information comprising content requests from a plurality of wireless communication devices utilizing services of a cellular communication system, identifications of the plurality of wireless communication devices, identifications of content sources supplying the content being requested, and network conditions during a period when the content requests are received and processed;
tagging the information to generate tagged information;
storing the tagged information in a user data repository;
receiving a new content request from a wireless communication device of the plurality of wireless communication devices;
retrieving tagged information according to the new content request, a first identification of the wireless communication device, a second identification of a content source supplying content identified in the new content request, or combinations thereof;
generating a communication session policy according to the tagged information; and
transmitting the communication session policy to a policy enforcement function system for facilitating a configuration of network elements that enable a communication session between the wireless communication device and the content source for transport of the content identified in the new content request, wherein the communication session is configured with a quality of service identified in the communication session policy.

2. The network policy management system of claim 1, wherein the communication session is further configured to use policy and charging control framework as defined by the third generation partnership project, and wherein network conditions comprise one of a state of traffic congestion, a state of operation of a network element in a communication network, or a combination thereof.

3. The network policy management system of claim 1, wherein the information collected further comprises location information indicating locations of the plurality of wireless communication devices at a time when the content requests were submitted, and wherein the policy enforcement function system comprises a policy and charging enforcement function system.

4. The network policy management system of claim 1, wherein the information collected further comprises a time to live indicator for each instance of content supplied to the plurality of wireless communication devices, and wherein the information is weighted according to the time to live indicator, or a relative timing between when the new content request was received and when the information was collected.

5. The network policy management system of claim 1, wherein the operations further comprise submitting a fee request to equipment of the content source supplying the content identified in the new content request, wherein collecting information further comprises collecting service requests, and wherein tagging the information further comprises tagging the information to generate information about sessions used to provide the requested services and the requested content.

6. The network policy management system of claim 5, wherein the fee request comprises a cost per bit fee.

7. The network policy management system of claim 5, wherein the operations further comprise:
receiving a message from the equipment of the content source responsive to the fee request; and
selecting the quality of service identified in the communication session policy from a plurality of quality of service options according to the message.

8. The network policy management system of claim 7, wherein the quality of service selected, when the message comprises an acknowledgment that the content source will pay a fee identified in the fee request, differs from an alternative quality of service selected when the message comprises a rejection to pay the fee identified in the fee request.

9. The network policy management system of claim 8, wherein the quality of service selected, when the message comprises the acknowledgment that the content source will pay the fee identified in the fee request, results in the communication session having enhanced services not available when the alternative quality of service is selected responsive to the message comprising the rejection.

10. The network policy management system of claim 7, wherein the message comprises an acknowledgment that the content source will pay a fee identified in the fee request, and wherein the operations further comprise informing a billing system of the acknowledgment.

11. The network policy management system of claim 1, wherein the operations further comprise:
determining according to the tagged information that the content identified in the new content request does not require prompt delivery;
scheduling a delivery time of the content; and
including the delivery time in the communication session policy transmitted to the policy enforcement function system.

12. The network policy management system of claim 1, wherein the cellular communication system is managed by a first service provider, and wherein the operations further comprise:
receiving a request from equipment of another cellular communication system managed by a second service provider, wherein the first and second service providers are independent entities; and
sharing the tagged information with the equipment of the other cellular communication system according to an agreement between the first service provider and the second service provider.

13. A non-transitory machine-readable storage medium, comprising executable instructions which, responsive to being executed by a processor, cause the processor to perform operations comprising:
- collecting transitory information relating to activities by a plurality of communication devices, activities by content sources supplying content to the plurality of communication devices, and network conditions during content exchanges between the plurality of communication devices and the content sources;
- tagging the transitory information to generate tagged transitory information;
- storing the tagged transitory information in a user data repository;
- receiving a new content request from a communication device of the plurality of communication devices;
- obtaining tagged transitory information relating to the new content request, a first identification of the communication device, a second identification of a content source supplying content identified in the new content request, or combinations thereof;
- generating a network configuration policy according to the tagged transitory information; and
- transmitting the network configuration policy to a policy enforcement function system for provisioning network elements that facilitate a communication session between the communication device and the content source for transport of the content identified in the new content request according to a quality of service identified in the network configuration policy.

14. A non-transitory machine-readable storage medium of claim 13, wherein the transitory information collected further comprises locations of the plurality of communications at a time when the content requests were submitted, and a time to live indicator for each instance of content supplied responsive to the content requests being collected.

15. A non-transitory machine-readable storage medium of claim 13, wherein the operations further comprise submitting a fee request to equipment of the content source supplying the content identified in the new content request.

16. A non-transitory machine-readable storage medium of claim 15, wherein the operations further comprise selecting the quality of service identified in the network configuration policy from a plurality of quality of service options according to a message received from the equipment of the content source responsive to the fee request.

17. A non-transitory machine-readable storage medium of claim 13, wherein the operations further comprise:
- determining according to the tagged transitory information that the content identified in the new content request does not require prompt delivery;
- scheduling a delivery time of the content; and
- including the delivery time in the network configuration policy transmitted to the policy enforcement function system.

18. A method, comprising:
- monitoring, by a system comprising a processor, events relating to activities by a plurality of communication devices, content sources supplying content to the plurality of communication devices, and network conditions during communication exchanges between the plurality of communication devices and the content sources;
- tagging, by the system, the events to generate tagged events;
- detecting, by the system, an event initiated by a communication device of the plurality of communication devices;
- obtaining, by the system, tagged event information from the tagged events according to the event detected;
- generating, by the system, a policy according to the tagged event information; and
- transmitting, by the system, the policy to a policy enforcement function system to facilitate a communication session between the communication device and the content source according to the policy.

19. The method of claim 18, wherein the activities monitored comprise locations of the plurality of communication devices and content requests submitted by the plurality of communication devices.

20. The method of claim 18, further comprising selecting a quality of service identified in the policy from a plurality of quality of service options according to an acknowledgment received from the content source to pay a fee for facilitating the communication session with the communication device.

* * * * *